United States Patent
Allen (10) Patent No.: US 9,609,031 B1
(45) Date of Patent: Mar. 28, 2017

(54) PROPAGATING STATE INFORMATION TO NETWORK NODES

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 460 days.

(21) Appl. No.: 14/109,006

(22) Filed: Dec. 17, 2013

(51) Int. Cl.
  *G06F 15/16* (2006.01)
  *H04L 29/06* (2006.01)
  *H04L 12/24* (2006.01)

(52) U.S. Cl.
  CPC ............ *H04L 65/403* (2013.01); *H04L 41/12* (2013.01)

(58) Field of Classification Search
  None
  See application file for complete search history.

(56) References Cited

U.S. PATENT DOCUMENTS

| | | | | |
|---|---|---|---|---|
| 7,266,085 B2* | 9/2007 | Stine | .................... | H04L 12/5695 370/252 |
| 8,972,585 B2* | 3/2015 | Hopkins | ............. | H04L 12/2697 370/236 |
| 2009/0086663 A1* | 4/2009 | Ho | ......................... | H04W 40/32 370/328 |
| 2009/0161594 A1* | 6/2009 | Zhu | ......................... | H04L 12/18 370/312 |
| 2013/0067557 A1* | 3/2013 | Allison | ............... | H04L 63/0218 726/11 |
| 2016/0191646 A1* | 6/2016 | Yang | ....................... | H04L 67/22 709/213 |

* cited by examiner

*Primary Examiner* — Thomas Dailey
(74) *Attorney, Agent, or Firm* — Davis Wright Tremaine LLP (57) ABSTRACT

Method and apparatus for propagating state information updates are disclosed. In the method and apparatus, a node establishes connections with one or more nodes of a plurality of nodes based at least in part on the number of connections retained by each node of the plurality of nodes. The node may then propagate state information updates to the one or more nodes.

22 Claims, 8 Drawing Sheets

PROPAGATING STATE INFORMATION TO NETWORK NODES

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool of networked resources provided by a computing resource provider, whereby the networked resources may include thousands or millions of computing devices.

The networked resources of a computing resource provide may often be required to be updated with information in order to serve the needs of customers. Centralized approaches for information propagation across networked resource are prone to malfunction due at least in part to the single point of failure associated with these approaches. Further, it is also challenging to propagate information updates across large-scale network in a de-centralized manner while minimizing the occurrence of redundant updates.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include propagating state information or updates thereof to network nodes. As described herein the state information may include any type of data that may be retained by a network node, whereby examples of the state information include user information, network or Internet protocol (IP) address information. Further, the state information may include any type of software update intended for the node. Additionally, as described herein, a node may be any type of computing device including, but not limited to, a computer system, a server, a host machine or a storage drive. The node may retain any type of the state information to facilitate providing computing functionality to users and customers. For example, the node may store the state information in local storage or database and may utilize the state information to provide computing functionality to customers. Further, the node may be configured to update retained state information by, for example, adding newly received state information to retained state information or modifying retained state information in accordance with received state information. Further, the node may be configured to reconcile retained state information with state information associated with another node, identifying both elements that are common and elements that are different among the state information being reconciled and updating the retained state information to be up-to-date or in-sync with the state information of the other node.

A node may be connected with another node in a network, whereby the connection may be utilized to facilitate communication between the nodes. Further, the connection facilitates the direct exchange of state information between the two nodes. The connection also alleviates the need for two nodes to exchange state information indirectly, for example, using an intermediary node to forward state information to or from the two nodes. Accordingly, the existence of a connection between two nodes results in expedient propagation of information state updates.

In accordance with a de-centralized approach for state information propagation, a node (for example, a node that is joining an existing network of nodes) may discover neighboring nodes. A neighboring node may be part of a sub-network of nodes within a larger network or may be within a specified round-trip time (RTT) of the node. Further, the node may utilize a broadcast or multicast message to discover the neighboring nodes and the neighboring nodes may respond accordingly. The node may request that each of the neighboring nodes indicate to the node the number of nodes to which each neighboring node is connected. The node may receive the number of neighboring node connections associated with each neighboring node and based on the received number, the node may determine the neighboring nodes with which to establish a connection. Determining the neighboring nodes may be done stochastically or probabilistically. A limit may be imposed on the number of neighboring node connections the node may make.

The probability of establishing a connection with a neighboring node may be positively biased to nodes with greater connectivity, whereby the likelihood of establishing a connection with a neighboring node may be proportional (for example, linearly or non-linearly) to the number of connections associated with the neighboring node. Upon determining the neighboring nodes with which to establish a connection, the node may receive state information updates from any one of its neighboring nodes. The node may further incorporate the state information updates into its retained state information. The node may also propagate the state information updates to its other connected neighboring. For example, the node may randomly select a neighboring node to propagate the received state information. To prevent propagating redundant updates, the node may exclude from the selection process the neighboring node from which the node received the state information. The process may be repeated, whereby the node may select a subsequent node and forward the state information to that node.

Figure 1:
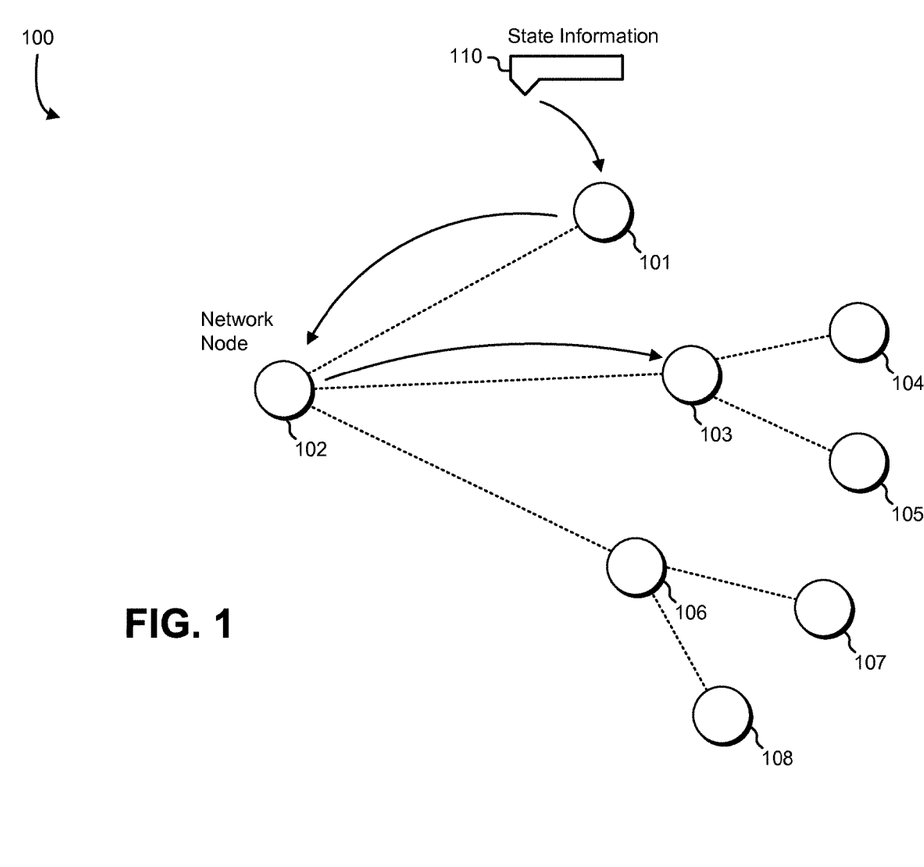
FIG. 1 shows an example of state information propagation in accordance with at least one embodiment.

FIG. 1 shows an example of state information propagation in accordance with at least one embodiment. A network 100 comprises a plurality of network nodes 101-108. Some of the nodes are connected as illustrated by the dashed line, whereas other nodes are not connected and may rely on one or more intermediary nodes for state information propagation. Node 101 receives state information (for example, from another node in the network 100 or from a network device). The state information 110 may include an update over state information retained by the node 101. Node 101 is connected to node 102 and forwards the state information 110 to node 102. Similarly, node 102 forwards the state information 110 to node 103. The propagation of state information may eventually result in all the nodes 101-108 of the network receiving the state information 110.

Figure 2:
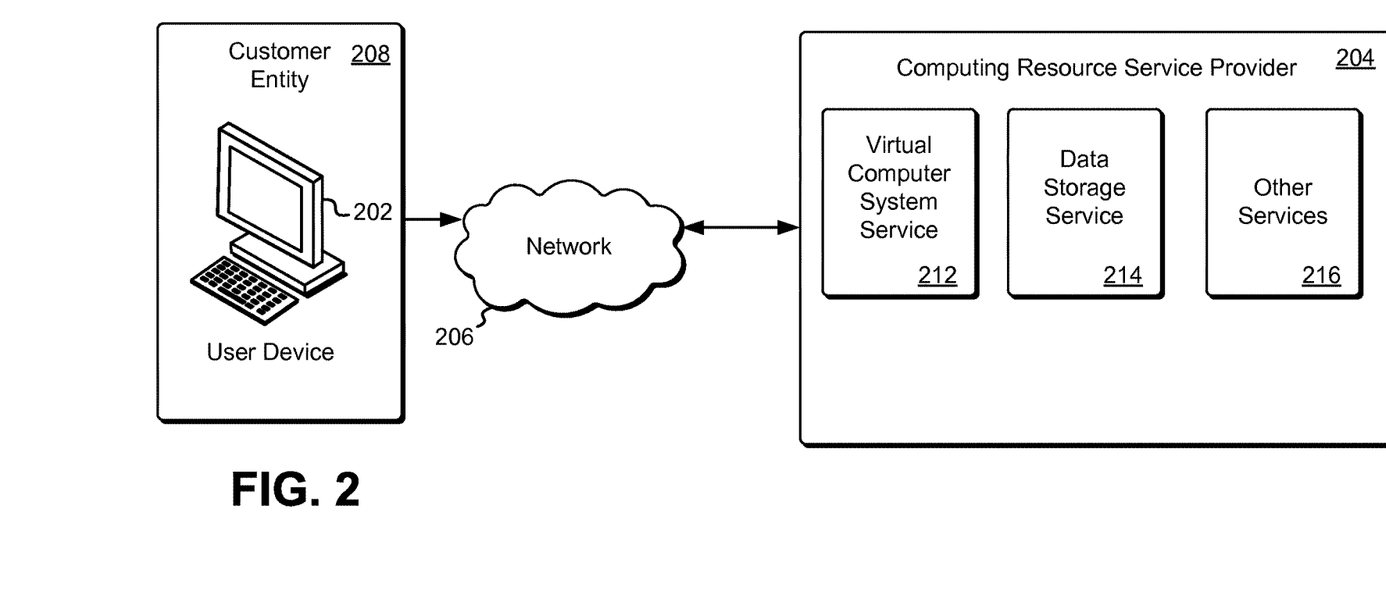
FIG. 2 shows an example of a user device in communication with a computing resource service provider in accordance with at least one embodiment.

FIG. 2 shows an example of a user device in communication with a computing resource service provider in accordance with at least one embodiment. The user device 202 is associated with a customer entity 208 and communicates with the computing resource service provider 204 over a network 206. The customer entity 208 may be an organization or group, whereby the organization or group may utilize the services of the computing resource service provider 204 for a variety of purposes, such as running web or email servers, operate business applications or, generally, providing computing power for customer servers. Although one user device 202 is shown as belonging to the customer entity 208, it is noted that a plurality of devices may be associated with the customer entity 208. In addition, one or more of the devices may belong to an administrator that is responsible for assigning privileges and permissions to the users associated with the customer entity 208.

The user device 202 may be any device that is configured to communicate with the computing resource service provider 204 or its associated entities. The user device 202 may also be equipped with local or remote (for example, network-based) computational and storage capabilities. The user device 202 may also be equipped with communications and networking hardware and may be configured to communicate using any communications protocol. Further, the user device 202 may be equipped with input/output (I/O) devices that may include a display, a touch screen-based or keyboard-based input device or speakers. Additionally, the user device 202 may include any type of memory, such as static or dynamic memory and a power source or a power adapter. The user device 202 may be associated with a customer, which may be an organization that may utilize one or more of the services provided by the computing resource service provider 204, for example, to maintain and deliver information to its employees, which may be located in various geographical locations. Additionally, the customer may be an individual that utilizes the services of the computing resource service provider 204 to deliver content to a working group located remotely.

The network 206 may be a collection of routers, switches or various other types devices that enable data (for example, protocol-compliant packets) to be exchanged between the user device 202 and the computing resource service provider 204. The network 206 may be public or private, whereby examples of the network 206 include the Internet, an intranet or an Internet service provider (ISP) network.

The computing resource service provider 204 may provide various computing resource services to its customers. The services provided by the computing resource service provider 204, in this example, include a virtual computer system service 212 and a data storage service 214. It is noted that not all embodiments described herein include the services 212-214 described with reference to FIG. 2 and additional services may be provided in addition to or as an alternative to services explicitly described herein. As described herein, each of the services 212-214 may include one or more web service interfaces that enable the customer to submit appropriately configured application programming interface (API) calls to the various services through web service requests. In addition, each of the services 212-224 may include one or more service interfaces that enable the services to access each other (e.g., to enable a virtual computer system of the virtual computer system service 212 to store data in or retrieve data from the data storage service 214).

The virtual computer system service 212 may be a collection of computing resources configured to instantiate virtual computer systems on behalf of a customer. The customer may interact with the virtual computer system service 212 (via appropriately configured and authenticated API calls) to provision and operate virtual computer systems that are instantiated on physical computing devices hosted and operated by the computing resource service provider 204. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 212 is shown in FIG. 2, any other computer system or computer system service may be utilized in the computing resource service provider 204, such as a computer system or computer system service that does not employ virtualization, instantiation or abstraction and instead provisions computing resources on dedicated or shared computers/servers and/or other physical devices.

The data storage service 214 may comprise one or more computing resources that collectively operate to store data for a customer using any type of storage, such as block-level storage or object-level storage. Storage devices utilized by the data storage service 214 may, for instance, be operationally attached to virtual computer systems provided by the virtual computer system service 212 to serve as logical units (e.g., virtual drives) for the computer systems. A storage device may enable the persistent storage of data used/generated by a corresponding virtual computer system where the virtual computer system service 212 may only provide ephemeral data storage.

The computing resource service provider 204 may additionally maintain one or more other services 216 based at least in part on the needs of customers. For instance, the computing resource service provider 204 may maintain a database service. The database service may be a collection of computing resources that collectively operate to run one or more databases and a customer may operate and manage a database from the database service by utilizing appropriately configured API calls. This, in turn, may allow for maintaining and potentially scaling the operations in the database. Other services include, but are not limited to, object-level archival data storage services, services that manage and/or monitor other services and/or other services.

Figure 3:
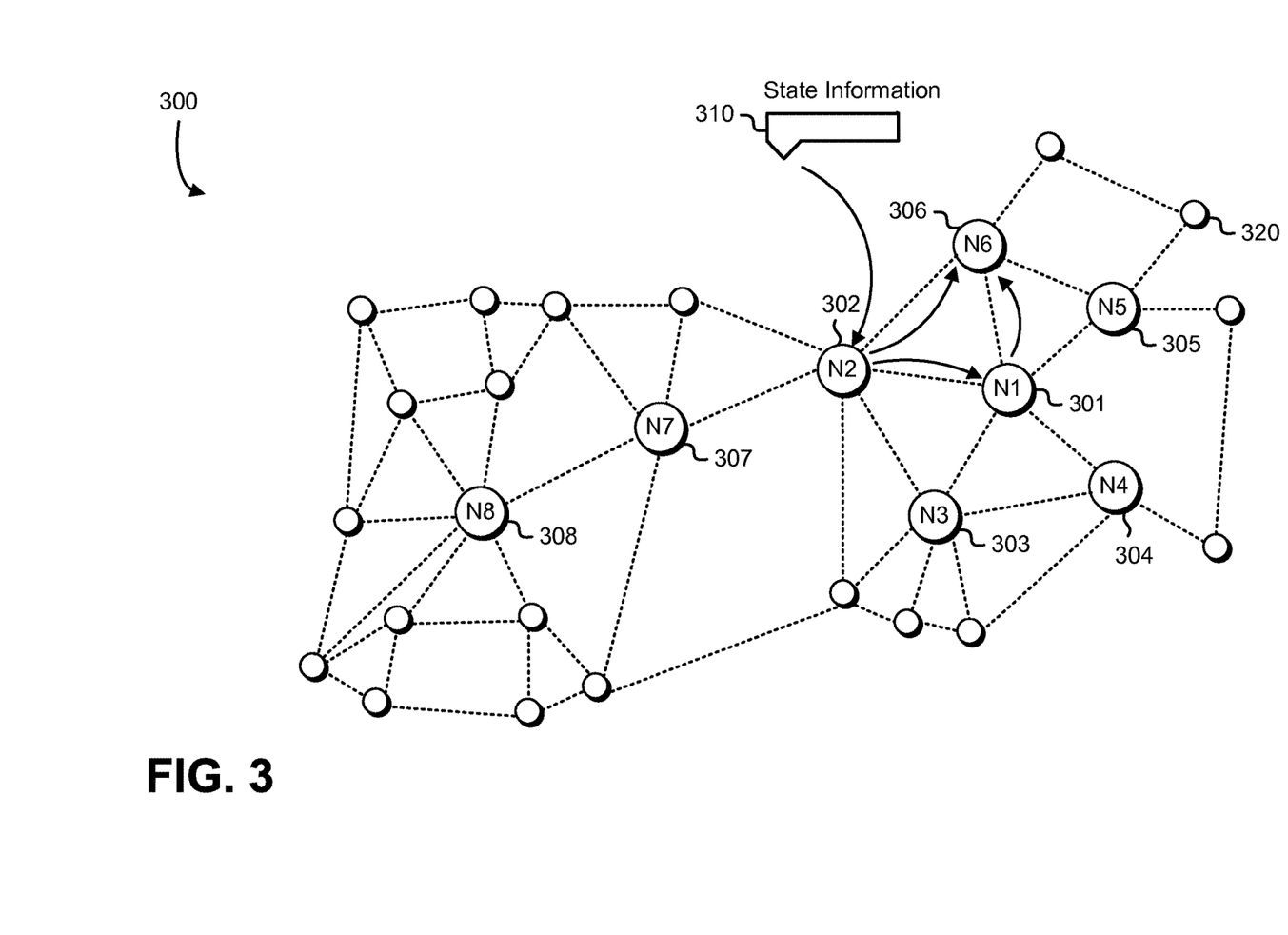
FIG. 3 shows an example of node connectivity in accordance with at least one embodiment.

FIG. 3 shows an example of node connectivity in accordance with at least one embodiment. A network 300 comprises a plurality of nodes 320. The plurality of nodes 320 include nodes N1-N8 301-308 that are each assigned a unique identifier and numeral to facilitate description. The network 300 may be a large-scale network whereby the number of nodes 320 that are part of the network may be in the thousands or millions. Each node 320 has one or more neighboring nodes and the node may establish a connection (illustrated by a dashed line in FIG. 3) with some or all of the one or more neighboring nodes. The connection may be unidirectional or bidirectional channel between the node and the one or more neighboring nodes and the connection may facilitate the exchange of state information between the two nodes. The state information may be any type of information that may be shared between two nodes. The state information may include user information or data, an identity of a new user, a generic message, registration information of the new user, information associated with the creation of a new account, an instruction to reserve an address (for example, an IP address), among others. In some embodiments, the state information may be any type of a discrete unit of data. When one or more nodes of the network 300 are utilized for an e-commerce application, the state information may be associated with the addition of a particular item to a user's shopping cart, whereby, for example, the state information may include an identifier of the user along with an identifier of a stock keeping unit (SKU) of the item.

As described herein, a node may be a host computer, a server, a storage device or any other type of device that is configured to provide a computing functionality. For example, the node may be a server that provides computing functionality as part of a virtual computer system service or a hard drive in a data storage service as described herein. The node may be equipped with I/O capability that enables the node to communicate with various parties, such as other nodes, users, network administrators and the like. Further, the node may be equipped with local or remote (for example, network-based) computational and storage capabilities. The computational capabilities of the node may be provided at least in part by a processor, such as a central processing unit (CPU), graphics processing unit (GPU) and digital signal processor (DSP), among others. Examples of CPUs include CPUs that employ an x86 architecture or a reduced instruction set computing (RISC) architecture. The node may also be equipped with communications and networking hardware and may communicate using any communications protocol. The node may include any type of memory, such as static or dynamic memory, and a power source or a power adapter. Aside from its hardware capability, the node may be configured to run or execute an operating system and/or other programs and the node's associated memory may store executable instructions that, when executed by one or more processor, cause one or more functions to be performed or cause the operating system and or/other programs to run. The node may be utilized a customer, which may be an organization, to maintain and deliver information to its employees, which may be located in various geographical locations. Additionally, the customer may be an individual that utilizes the node to deliver content to a working group located remotely.

Each node of the plurality of nodes 320 may retain state information. For example, a node may store a record of the state information in local or remote storage. Further, each node may also be capable of receiving state information updates from others nodes in the network 300 or a network device (for example, a router). Upon receiving a state information update, a node may incorporate the received update in the record of state information.

To establish a connection between two nodes, a node may transmit a multicast message or a presence message to one or more neighboring nodes. The one or more neighboring nodes may be within a radius of the node. Further, the one or more neighboring nodes may be part of a group of nodes, such as a subnet or a net block. The multicast message or the presence message may be received by the one or more neighboring nodes and the one or more neighboring node may respond to the multicast message or the presence message and a connection may be established between the two nodes. Nodes that are configured to establish a connection or nodes that are configured to receive or respond to multicast or presence message are referred to herein as neighboring nodes.

Referring to FIG. 3, few or no limits may be imposed on the number of neighboring nodes connections that a node may establish. In the network, node N2 302 is connected to a plurality of neighboring nodes, which include node N1 301 and node N6 306, among others. The existence of neighbor connections facilitates propagating state information or updates thereof among the nodes of the network. To propagate state information, a node that receives state information may share the state information with neighboring nodes using their neighbor connections. Two neighboring nodes may negotiate state information updates, whereby a node receiving state information may determine whether the received state information is in fact new or whether the node already has the state information. The receiving node may then update its associated record or database accordingly, for example, by causing the new state information to be incorporated or by ignoring the state information if the node already retains the received state information.

As shown in FIG. 3, node N2 302 receives state information 310 that is sought to be propagated to the remaining nodes in the network 300. The state information 310 may be new to node N2 302 or the network 300 or may be an update to existing state information held by node N2 302. Node N2 302 may then cause the state information 310 to be propagated to neighboring nodes N1 301 and N6 306, among others. Further, upon receiving the state information 310 node N1 301 may, in turn, cause the state information to be propagated to its neighboring nodes. Accordingly, node N6 306 may also receive the state information 310 from node N1 301.

Node N6 306 may have updated its record in accordance with the received state information 310 from node N2 302 and the receipt of the state information from node N1 301 may be deemed a redundant update. In the node connectivity approach described with reference to FIG. 3, few or no limits may be imposed on a node's ability to establish connections with neighboring nodes and utilize the connections to propagate state information 310. Further, the approach is also de-centralized as individual nodes are permitted to propagate information without a need for a centralized authority to manage or oversee the forwarding of state information 310.

To alleviate some of the drawbacks associated with the graph described with reference to FIG. 3, such as the prevalence of redundant updates, a node's ability to establish neighbor connections may be limited. However, limiting the node's ability to establish neighbor connections, while reducing redundant updates, may not fully optimize the propagation of state information across a network. As described herein, establishing neighbor connections may be positively biased to nodes that retain a relatively larger number of neighbor connections. Accordingly, the resulting network connectivity may be comprised of a number of nodes that may be deemed as information centers or information brokers. The information brokers may be highly connected and may propagate state information updates to many nodes. Further, lower-degree nodes may facilitate propagating state information updates between the information brokers.

Figure 4:
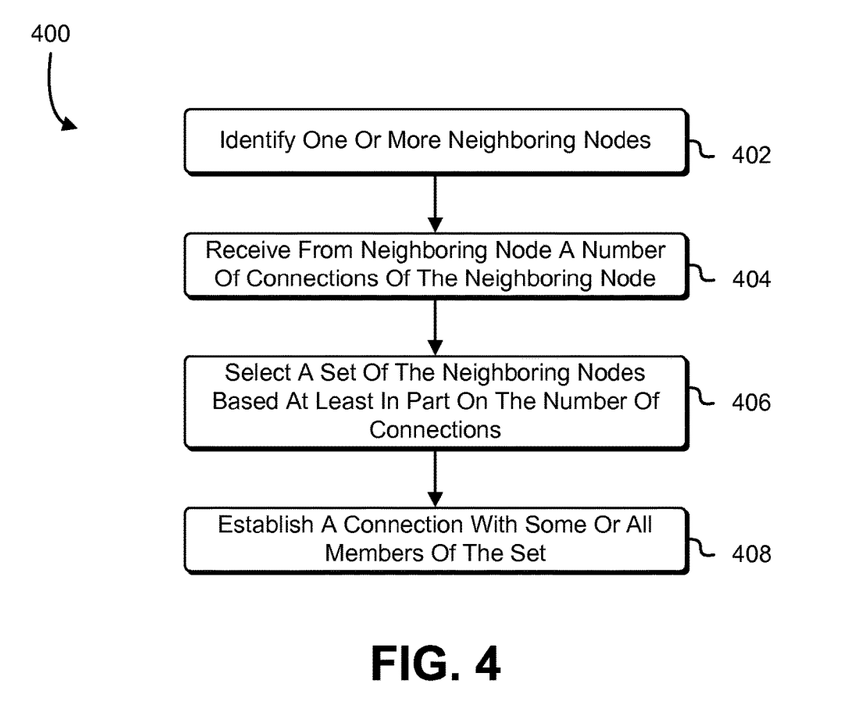
FIG. 4 shows an example of a method for establishing a node connection in accordance with at least one embodiment.

FIG. 4 shows an example of a method for establishing a node connection in accordance with at least one embodiment. In the process 400, a node identifies 402 one or more neighboring nodes. The node may seek to join the network and may identify the one or more neighboring nodes by utilizing any type of discovery protocol that may include the exchange of discovery messages. Examples of discovery messages include a broadcast or multicast message that is sent to surrounding nodes within a radius or within a subnet or a net block. A neighboring node may receive the discovery message and may respond accordingly, for example, on a dedicated channel between the originating node and the neighboring node. It may not be required that all nodes that receive the discovery message respond to the discovery message, whereby, for example, a node may be unavailable for responding or may not seek to further establish a neighbor connection.

The node then receives 404 from each neighboring node a number connections of the neighboring node. The number connections may be the number nodes with which the neighboring node is connected. The number of connections may indicate the level of connectivity for each neighboring node, whereby, for example, neighboring nodes that are associated with a large number of connections may be deemed to be information brokers that are capable of propagating information to a larger number of nodes than neighboring nodes associated with a relatively smaller number of connections. The number of connections associated with a node may be proportional to the node's ability to propagate state information updates. Further, the number connections may be received over a dedicated channel and in response to a request for the number of connections.

The node selects 406 a set of the neighboring nodes based at least in part on the number of connections associated with the neighboring node. The likelihood of selecting a neighboring node may be a function of the number of connections associated with the neighboring node, whereby neighboring node selection may be performed probabilistically or stochastically. The selection may be biased towards neighboring nodes having relatively larger numbers of connected neighbors. In some embodiments, the probability of selecting a neighboring node may be weighed by or proportional to the number of connections of the neighboring node. For example, if a node has three neighboring nodes where a first neighboring node has one connection, a second neighboring node has two connections and a third neighboring node has four connections, the third neighboring node may be two times as likely to be selected as the second neighboring node and four times as likely to be selected as the first neighboring node. It is noted that various approaches for biased neighboring node selection are within the scope of the embodiments described herein. For example, any type of modified selection criteria that favors connected neighbors may be utilized. In an embodiment, when $n_i$ denotes the number of connections of a neighboring node having an index i, the probability of selecting the neighboring node (denoted as $P_i$) is represented as:

$$P_i = \frac{n_i}{\sum_j n_j} \quad \text{Equation (1)}$$

where $\sum_j n_j$ is the sum of the number of connections of the neighboring nodes (for example, the nodes from which a discovery response is received).

A limit may be imposed on the number of selected neighboring nodes. The limit may be a pre-specified number or may be based at least in part on the number of discovered neighboring nodes. For example, the limit may be a percentage of discovered neighboring nodes, whereby given that the limit is set to 10% and a node discovers 100 neighboring nodes, the node may establish ten neighbor connections. Following neighboring node selection, the node establishes 408 a connection with some or all of the members of the set of selected neighboring nodes. Establishing the connection based at least in part on biased neighboring node selection causes the node to gravitate towards making connections with more heavily connected neighbors as described herein. Further, not precluding the node from establishing a connection with relatively less connected neighboring nodes results in injecting an element of randomness in connection establishment.

Figure 5:
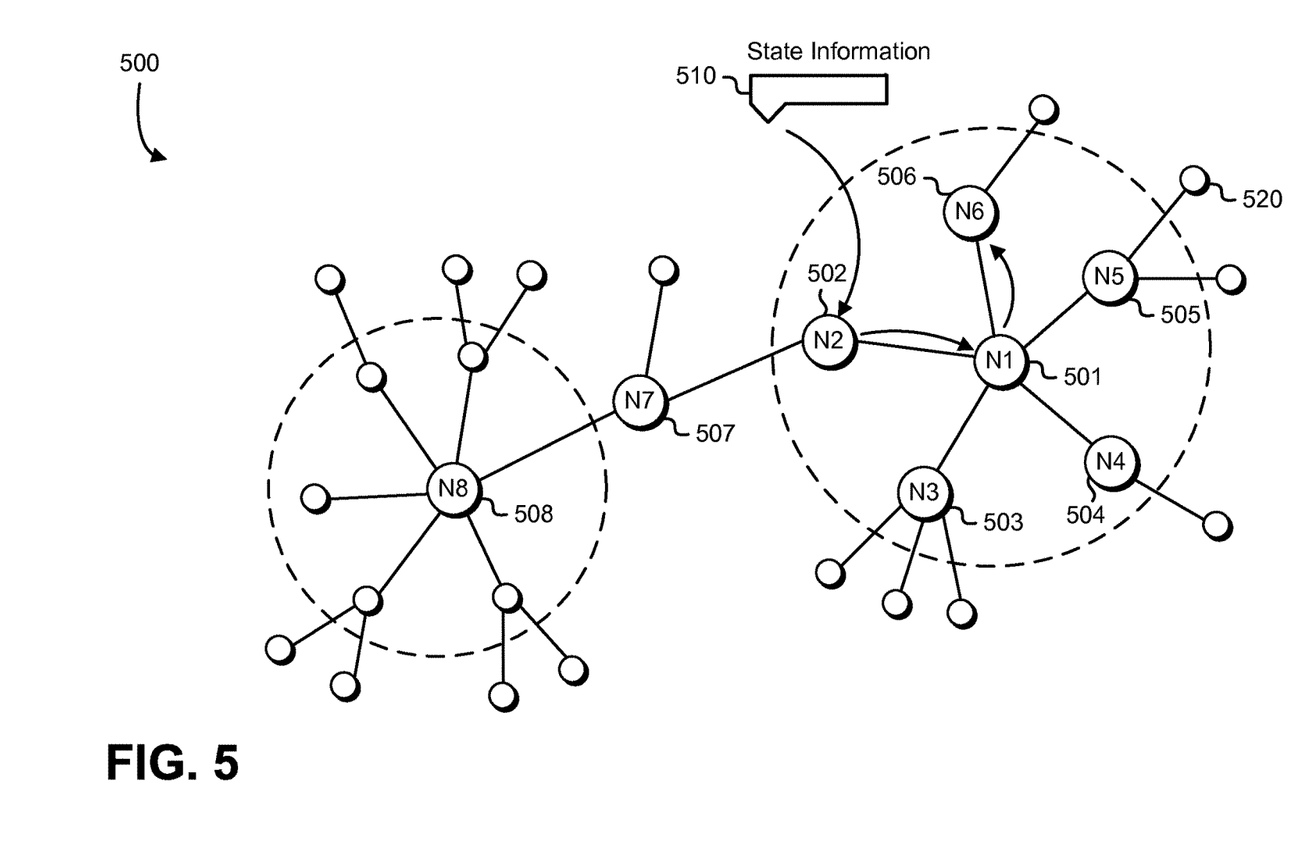
FIG. 5 shows an example of a network in accordance with at least one embodiment.

FIG. 5 shows an example of a network in accordance with at least one embodiment. The network 500 comprises a plurality of nodes 520, which are the same as the nodes described with reference to the network 300. However, the plurality of nodes 520 of network 500 have a different connectivity structure than those described with reference to FIG. 3. The plurality of nodes 520 include nodes N1-N8 501-508 that are each assigned a unique identifier and numeral to facilitate description. The node connectivity shown in FIG. 5 may be a result of utilizing the method 400 for establishing neighboring node connection described with reference to FIG. 4. It is noted that the example of the network 500 of FIG. 5 is non-limiting and other network connectivity topologies may be generated as a result of performing the methods described herein. Further, it is noted that, in various embodiments, the network 500 is not a complete graph, whereby in a complete graph each node establishes a connection with all other nodes in the network or all neighboring nodes. As described herein, a complete graph may not minimize redundant state information updates due to the high likelihood of a node receiving the same information state update from a plurality of connected neighbors.

Each solid line between two nodes represents a connection between the two nodes. As a result of the connection establishment described herein, nodes N1 501 and N8 508 are highly connected relative to the remaining nodes and nodes N1 501 and N8 508 may be utilized for propagating state updates to other nodes. For example, state information 510 received by node N2 802 may be propagated to node N6 806 via node N1 801. In addition, the lack of connectivity between node N2 502 and node N6 806 spares node N6 506 from receiving a redundant update from node N2 502. It is noted that the lack of connection between N2 502 and N6 506 may be the result of biased selection as described herein, whereby node N2 is more likely to establish a connection with node N1 501 than node N6 506 due to the fact that node N1 501 has a larger number of neighboring node connections than node N6 506. Similarly, node N6 506 is more likely to establish a connection with node N1 501 than node N2 502 due to the larger number of neighboring node connections associated with node N1 501.

Node connectivity of the network 500 described with reference to FIG. 5 is advantageous over highly connected networks (e.g., networks in which nodes are permitted to establish as many connections as possible) in that in the network 500 it is less likely to propagate redundant updates. For example, in a highly connected network a node is more likely to receive redundant updates and utilize computational resources in propagating the redundant updates. Conversely, in the network 500, highly connected nodes, such as nodes N1 501 and N8 508, serve as information brokers that propagate state updates to other nodes in the network 500, such as nodes N2-N7 502 507. Nodes that are not highly connected, such as nodes N2 502 and N7 507 may, in turn, propagate state updates between the highly connected nodes. For example, nodes N2 502 and N7 507 are more likely to establish a connection with highly connected nodes than less connected nodes and, accordingly, nodes N2 502 and N7 507 may facilitate propagating state updates between the highly connected nodes.

Figure 6:
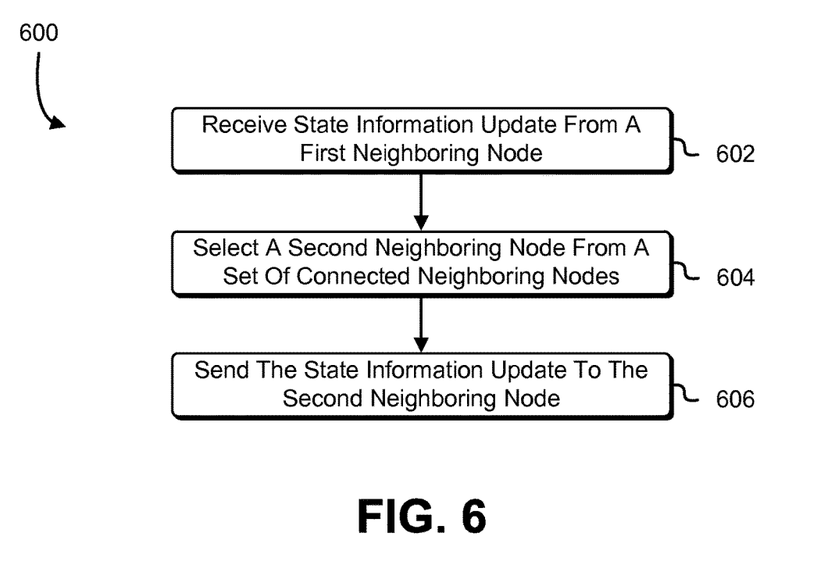
FIG. 6 shows an example of a method for state information propagation in accordance with at least one embodiment.

FIG. 6 shows an example of a method for state information propagation in accordance with at least one embodiment. In the process 600, a node, such as node 520 described with reference to FIG. 5, receives 502 a state information update from a first neighboring node. The state information may, for example, be an update to the node's existing state information. The state information may be received by the first neighboring node from a network device, such as a router or a load balancer. The network device may receive data from a network, such as the Internet, and may forward the data to the first neighboring node for processing. The network device may select the first neighboring node randomly or based at least in part on the availability of the node to process the data or satisfy a request to which the data pertains. For example, network work device may receive a request to create a new user account. The network device may forward the request to the first neighboring node for processing and the first neighboring node may determine based at least in part on processing the request that the request necessitates a state information update to incorporate the new user information. The first neighboring node may forward the state information update to the node.

The node may receive the state information update from the first neighboring node by polling (for example, periodically or according to a specified schedule) the first neighboring node and requesting state information updates from the first neighboring node. The polling may be performed in a unidirectional manner by either node. Alternatively, a bidirectional exchange of state information may be performed by, for example, combining the state information retained by the two nodes and populating the state information in the two nodes.

The node then selects 604 a second neighboring node from its set of connected neighboring nodes. The selection may be performed randomly, whereby each neighboring node may have an equal probability of being selected. The first neighboring node may be excluded from the selection so as to guard against redundant state updates. For example, if the node has m neighboring nodes that may be selected for propagating state information updates, the probability of selecting the second neighboring node from the set of m nodes may be denoted as P and may be represented as:

$$P = \frac{1}{m} \quad \text{Equation (2)}$$

Further, in some embodiments the selection may not be random, whereby the probability of selection may be based at least in part on or influenced by the number of connections associated with a neighboring node. The node sends 606 the state information update to the second neighboring node. After the sending the state information update, the second neighboring node may determine whether to incorporate the state information.

In some embodiments, more than one neighboring nodes may be selected for propagating state information updates, whereby increasing the number of selected neighboring nodes may increase the frequency of the propagation of state information updates. As described herein, the node from which the state information update is received may be excluded from the selection in order to mitigate redundant updates.

A node may retain a data structure for storing neighboring node identities. The data structure, which may be a ring buffer or a circular buffer, may have a size having an enforceable limit. The data structure may store the identities of neighboring nodes with which the node established a connection or to which state information updates were propagated. Because the ring buffer is size-limited and the oldest data in the ring buffer is the first to be overwritten (for example, due to recording node identities in a circular fashion), the ring buffer may only store the identities of neighboring nodes with which the node recently established a connection or to which the node recently propagated state information. The likelihood of selecting a node may be biased based at least in part on the data retained in the ring buffer. For example, the probability of selecting a neighboring node may decrease as the number of times the neighboring node identity appears in the data structure. Accordingly, the likelihood of selecting a neighboring node that is not up-to-date with the node is increased at the expense of a neighboring node that is in-sync with the node.

Further, neighboring node identities stored in the data structure may be associated with a constraint, such as a time-based constraint indicating a time of selection of the neighboring node. The neighboring node identities and the constraint may be used in selecting a neighboring node. For example, if a system parameter specifies that only neighboring nodes that have not been selected within a specified time period may be selected, the data structure may be used to exclude one or more neighboring nodes from selection. In other embodiments, the data structure may be used to retain identities of neighboring nodes that were selected within a specified time period, such as the last 15 minutes. Further, the neighboring nodes whose identities are stored in the data structure may be excluded from selection in order to avoid repeated or frequent selection of one or more nodes for state information propagation.

It may be desirable for the network 500 to be churned or re-randomized to avoid being defined by a set pattern of neighbor connections. Network churning is advantageous in that it results in repairing any disconnections that may occur in the network 500. A disconnection may occur when a portion of the network 500 becomes isolated from a remainder of the network 500 and no longer receives state information updates from the remainder of the network. Further, network churning may alleviate propagation delay experienced by a node in the network 500 by potentially reconnecting the node with another node. Network churning may occur naturally and may be stimulated by procedures employed in the network. For example, as new nodes come into service and establish connections with neighboring nodes, network churning will occur due to the newly established connections. Further, nodes may also malfunction and exit the network. The malfunctioning may, for example, be due to hardware failures, such as hard drive or processor failure. When a node exits the network and severs connections to its neighboring nodes, the neighboring node may replace the severed connection and re-connect with a different node. Dissolving an existing connection or establishing a new connection causes a network to be churned.

Churning may be stimulated by configuring one or more nodes of a network to re-new or replace connections. For example, a node may be configured to add one or more new connection if it is determined that the number of existing connections is below a threshold. Similarly, the node may be configured to terminate one or more connections if the number of existing connections of the node is above a threshold. Further, a node may be configured (for example, randomly, every specified period of time or according to schedule) to terminate a portion of or all of its existing connections or re-establish node connections as described herein.

State information that is trafficked between nodes may include updates to existing state information, whereby an originating node may send to a neighboring node state information that the originating node deems as new. Because state information that is not deemed as new may not be propagated by a node, any two nodes, whether connected directly or indirectly, may be synchronized with respect to recently updated state information but out-of-sync with respect to older state information. Each element of state information may be associated with a timestamp that may represent the time on which the state information was incorporated into the network. For example, the timestamp may represent the time on which the state information was first incorporated into a node of the network. A monitoring entity may sample the state information retained by two or more nodes and determine whether the state information associated with either one of the two nodes requires to be updated based at least in part on the timestamps associated with the state information.

Figure 7:
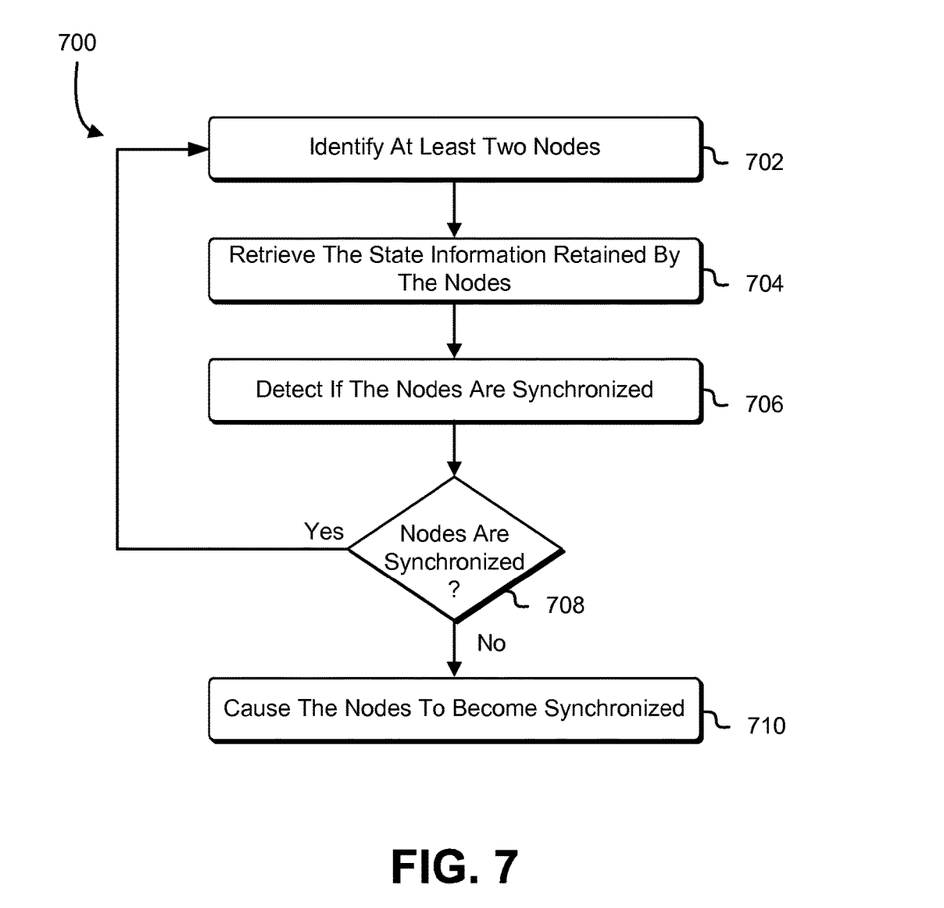
FIG. 7 shows an example of a method for monitoring state information in accordance with at least one embodiment.

FIG. 7 shows an example of a method for monitoring state information in accordance with at least one embodiment. In the process 700, a monitoring entity identifies 702 at least two nodes. The nodes may be identified randomly and the nodes may have a direct or an indirect connection with one another for propagating state information updates or, if there is a disconnection or a split in the network, the nodes may each belong to separate clusters of a network. The monitoring entity then retrieves 704 the state information retained by the nodes. The retrieved state information may include one or more timestamps that specify the time at which the state information was incorporated into network. The monitoring entity detects 706 if the nodes are synchronized. The nodes may be synchronized if the nodes retain the same state information or if the difference between the state information retained by the nodes is within a pre-specified margin. Conversely, the nodes may be out-of-sync if the difference between the state information retained by the nodes is greater than the margin. Detecting that the nodes are not synchronized may also include detecting a time period when the two nodes ceased to be synchronized or started to become synchronized. For example, the monitoring entity may determine that two nodes are not synchronous with respect to state information updates within the last five minutes but are synchronous with respect to state information updates that occurred prior to the last five minutes. Conversely and by way of example, the monitoring entity may determine that two nodes are synchronized with respect to recent state information updates but are not in-sync with respect to state information updates that were propagated more than 5 hours ago. If the monitoring entity determines 708 that the nodes are out-of-sync, the monitoring entity causes 710 the nodes to become synchronized.

In an embodiment, state information retained by one or more nodes may be partitioned and the portioned state information may be used to synchronize out-of-sync nodes. The state information retained by a node may be partitioned based at least in part on an identity associated with the state information (for example, a name associated with the state information) or a timestamp of the state information (for example, time of receipt by a node or a network). When partitioned, the state information may be categorized in two or more categories. One or more hash functions may be applied to the partitioned state information of a first node to produce one or more hash values. The one or more hash values may be shared with a second node that has similarly partitioned state information. The second node may also apply the one or more hash functions to its partitioned state information to produce one or more hash values, which may be compared to the received hash values. Based at least in part on the comparison, if the one or more hash values produced by the first and second nodes are determined to be different, the first and second nodes may be determined to be out-of-sync with respect to the partitioned hash values. Conversely, if the one or more hash values produced by the first and second nodes are determined to be the same, the first and second nodes may be determined to be synchronous with respect to the partitioned hash values. It is noted that the comparison may be performed by the first node, second node or the monitoring entity. Is it also noted that state information partitioning is advantageous in detecting asynchronous nodes and resolving state information differences between nodes for state information updates that occur over a particular time period or for certain types of state information as opposed to all historical state information updates.

Causing the nodes to become synchronized may include instructing the nodes to establish a connection with one another and resolve the differences in their state information. Once connected, the nodes may update their respective state information to include state information retained by the counterpart node. Further, one or more of the nodes may be requested to grow their respective connections to neighboring nodes to increase the likelihood of receiving state information updates.

The timestamps associated with state information may be used to identify a disconnection or a split in a network. For example, if the monitoring entity determines that two nodes retained common state information up to a certain point in time and subsequent to the point in time they retained different state information, the monitoring entity may determine that a disconnect in the network occurred at the identified point. Accordingly, the monitoring entity may trigger repairs in the network to fix the disconnection by, for example, requesting some nodes to increase their associated number of node connections.

Figure 8:
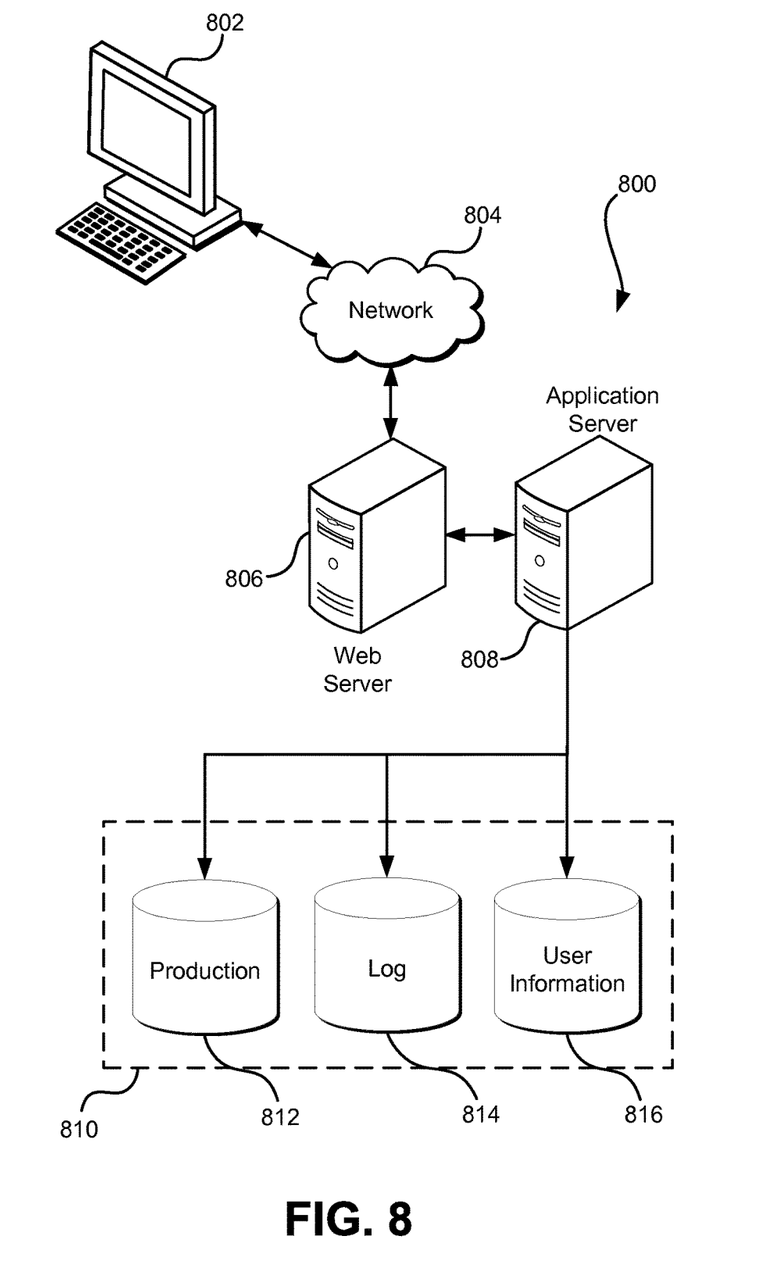
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for establishing one or more connections in a network, comprising:
    under the control of one or more computer systems configured with executable instructions,
        sending a discovery message to a plurality of neighboring nodes;
        in response to the discovery message, receiving from each node of the plurality of neighboring nodes a number of connections associated with each node, the number of connections specifying a number of nodes with which the node is capable of exchanging state information;
        stochastically selecting a set of nodes of the plurality of neighboring nodes for connection establishment, the selecting being performed based at least in part on the number of connections associated with the plurality of neighboring nodes and the selecting being positively biased to a first node of the plurality of neighboring nodes having a larger number of connections than a second node of the plurality of neighboring nodes; and
        establishing a connection with each node of the selected set of nodes, the connection enabling exchanging a state information update with each node of the selected set of nodes.

2. The computer-implemented method of claim 1, further comprising:
    receiving the state information update from a first node of the selected set of nodes;
    identifying a second node of the selected set of nodes for sending the state information update; and
    sending the state information update to the second node.

3. The computer-implemented method of claim 2, wherein:
    identifying the second node of the selected set of nodes includes probabilistically selecting the second node from the selected set of nodes; and
    the first node is excluded from selection.

4. The computer-implemented method of claim 1, wherein the probability of selecting the first node of the plurality of neighboring nodes is a function of the number of connections associated with the first node of the plurality of neighboring nodes and the number of connections associated with the plurality of neighboring nodes.

5. The computer-implemented method of claim 1, wherein the state information update includes at least one of user information, an identity of a new user, registration information of the new user, information associated with a creation of a new account or an instruction to reserve an address.

6. The computer-implemented method of claim 1, further comprising:
receiving a request to dissolve a connection with one or more nodes of the selected set of nodes;
dissolving the connection in accordance with the received request; and
re-establishing the connection with a different node of the plurality of neighboring nodes.

7. A system, comprising:
a second node configured to exchange state information directly with a plurality of nodes; and
a first node comprising one or more processors and memory including executable instructions that, as a result of being executed by the one or more processors of the first node, cause the first node to:
receive a number of connections from the second node, the number of connections specifying a count of the plurality of nodes;
probabilistically determine whether to establish a connection with the second node, the likelihood of establishing the connection being a function of the number of connections, the function indicating that the number of connections to the second node is greater than the number of connections to at least one node of the plurality of nodes; and
exchange state information directly with the second node on a condition that the connection is established.

8. The system of claim 7, wherein the memory of the first node further includes instructions that, as a result of being executed by the one or more processors, cause the first node to:
initiate sending a broadcast message to the second node, the broadcast message being initiated to determine whether the second node is available to be connected to the first node; and
receive a response from the second node, the response indicating the second node is available to be connected to the first node.

9. The system of claim 7, wherein exchanging state information directly with the second node further includes:
receiving the state information from a third node;
probabilistically selecting a node from a set of nodes, the set of nodes including the second node and excluding the third node; and
on a condition that the second node is selected, sending the state information to the second node.

10. The system of claim 9, wherein:
a size-limited data structure of the first node stores one or more identities of one or more nodes previously selected for propagating state information; and
probabilistically selecting the node from the set of nodes is based at least in part on a frequency of selecting the node as indicated by the data structure.

11. The system of claim 9, wherein:
a size-limited data structure of the first node stores one or more identities of one or more nodes previously selected for propagating state information and one or more timestamps associated with the previous selection of the one or more nodes; and probabilistically selecting the node from the set of nodes is based at least in part on the one or more timestamps associated with the previous selection of the one or more nodes.

12. The system of claim 7, wherein the state information includes at least one of user information, an identity of a new user, registration information of the new user, information associated with a creation of a new account or an instruction to reserve an address.

13. The system of claim 7, wherein the memory of the first node further includes instructions that, as a result of being executed by the one or more processors, cause the first node to:
receive a polling message from the second node, the polling message requesting state information; and
in response to the polling message, send the state information to the second node.

14. The system of claim 7, wherein:
the number of established node connections associated with the first node is limited by a threshold; and
the first node is further configured to cease establishing a node connection on a condition that the threshold is met.

15. The system of claim 7, wherein the memory of the first node further includes instructions that, as a result of being executed by the one or more processors, cause the first node to:
receive a request to dissolve the connection with the second node;
dissolve the connection in accordance with the received request; and
re-establish the connection with a third node, the third node being different than the second node.

16. A non-transitory computer-readable storage medium having collectively stored thereon executable instructions that, when executed by one or more processors of a computer system, cause the computer system to at least:
establish a connection to a set of computer systems of a plurality of computer systems, the set of computer systems being selected based at least in part on a number of connections associated with each computer system of the plurality of computer systems;
receive a state information update from an originating computer system of the set of computer systems; and
send the state information update to a probabilistically selected computer system of the set of computer systems based at least in part on the probabilistically selected computer system containing a first number of connections greater than a second number of connections associated with at least one other computer system of the plurality of computer systems, the state information update being sent directly over the established connection.

17. The non-transitory computer-readable storage medium of claim 16, wherein the number of connections associated with each computer system of the plurality of computer systems is a count of direct connections maintained by the computer system of the plurality of computer systems to a second set of computer systems.

18. The non-transitory computer-readable storage medium of claim 16, wherein the likelihood of selecting a computer system to the set of computer systems is proportional to the number of connections associated with the computer system.

19. The non-transitory computer-readable storage medium of claim 16, wherein the instructions further comprise instructions that, when executed by the one or more processors, cause the computer system to:
    maintain state information in a data store; and
    upon receiving a state information update from the originating computer system, incorporate the state information update into the data store.

20. The non-transitory computer-readable storage medium of claim 16, wherein the instructions further comprise instructions that, when executed by the one or more processors, cause the computer system to:
    poll the originating computer system to determine whether the originating computer system received the state information update; and
    in response to the polling, receive the state information update from the originating computer system.

21. The non-transitory computer-readable storage medium of claim 16, wherein the instructions further comprise instructions that, when executed by the one or more processors, cause the computer system to:
    sever the connection to one or more computer systems of the set of computer systems periodically or based at least in part on receipt of a trigger; and
    establish a second connection to one or more other computer systems, the one or more other computer systems being different than the one or more computer systems of the set of computer systems.

22. The non-transitory computer-readable storage medium of claim 16, wherein:
    the instructions further comprise instructions that, when executed by the one or more processors, cause the computer system to:
        send a broadcast or multicast message to each computer system of the plurality of computer systems; and
        receive a response from each computer system of the plurality of computer systems indicating availability to establish the connection; and
    the instructions that cause the computer system to establish the connection to the set of computer systems of the plurality of computer systems further include instructions that cause the computer system to impose a limit on a number of members of the set of computer systems.

* * * * *